US008015501B2

(12) United States Patent
Conrad et al.

(10) Patent No.: US 8,015,501 B2
(45) Date of Patent: Sep. 6, 2011

(54) ACCESSING PREVIOUSLY VIEWED WINDOWS

(75) Inventors: Peter Conrad, Leiman (DE); Theo Held, Wiesloch (DE); Michael Kuehn, Palo Alto, CA (US); Janaki P. Kumar, Palo Alto, CA (US); Dietrich Mayer-Ullmann, Ilvesheim (DE); Deborah Rodgers, Framingham, MA (US)

(73) Assignee: SAP Aktiengesellschaft, Walldorf (DE)

( * ) Notice: Subject to any disclaimer, the term of this patent is extended or adjusted under 35 U.S.C. 154(b) by 612 days.

(21) Appl. No.: 10/884,004

(22) Filed: Jul. 2, 2004

(65) Prior Publication Data

US 2005/0160353 A1   Jul. 21, 2005

Related U.S. Application Data

(60) Provisional application No. 60/496,330, filed on Aug. 18, 2003.

(51) Int. Cl.
*G06F 3/048* (2006.01)

(52) U.S. Cl. ........ 715/783; 715/806; 715/819; 715/820; 715/851; 715/855

(58) Field of Classification Search .................. 715/778, 715/783, 806, 807, 819, 820, 829, 851, 855
See application file for complete search history.

(56) References Cited

U.S. PATENT DOCUMENTS

| | | | | | |
|---|---|---|---|---|---|
| 4,823,283 A | * | 4/1989 | Diehm et al. | .................. | 715/825 |
| 5,119,475 A | * | 6/1992 | Smith et al. | .................... | 715/866 |
| 5,179,653 A | * | 1/1993 | Fuller | ............................ | 715/840 |
| 5,287,514 A | * | 2/1994 | Gram | ............................ | 715/826 |
| 5,396,264 A | * | 3/1995 | Falcone et al. | ................. | 715/811 |
| 5,420,975 A | * | 5/1995 | Blades et al. | .................. | 715/811 |
| 5,430,839 A | | 7/1995 | Jagannathan et al. | | |
| 5,625,783 A | * | 4/1997 | Ezekiel et al. | ................. | 719/320 |
| 5,819,263 A | * | 10/1998 | Bromley et al. | ................... | 707/3 |
| 5,854,630 A | * | 12/1998 | Nielsen | .......................... | 715/739 |
| 5,963,964 A | * | 10/1999 | Nielsen | .......................... | 715/255 |

(Continued)

FOREIGN PATENT DOCUMENTS

EP   0694829 A1   1/1996

(Continued)

OTHER PUBLICATIONS

"Mind's Eye Visual Business 98", *Mind's Eye, Inc.*, obtained from the Internet at http://web.archive/org/web/20030301044402/http://minseyeinc.com/visualbusiness/ on Jan. 26, 2005, 4 pages.

(Continued)

*Primary Examiner* — Ba Huynh
(74) *Attorney, Agent, or Firm* — Fish & Richardson P.C.

(57) ABSTRACT

One implementation provides a method for accessing a window previously viewed by a user in a graphical user interface (GUI) during an interaction with an individual. The method includes displaying to the user a first window in the GUI. The first window contains a collapsible/expandable menu. The menu contains an entry that refers to a window previously viewed by the user. Upon selection of the entry in the menu, the method further includes displaying to the user the corresponding window previously viewed by the user in the GUI. The corresponding window has a data-entry field that contains a latest version of information that is related to the interaction with the individual that was previously entered or modified by the user.

7 Claims, 7 Drawing Sheets

U.S. PATENT DOCUMENTS

| | | | | |
|---|---|---|---|---|
| 5,991,773 | A * | 11/1999 | Tagawa | 1/1 |
| 6,011,555 | A * | 1/2000 | Eckhoff et al. | 715/843 |
| 6,012,093 | A * | 1/2000 | Maddalozzo et al. | 709/223 |
| 6,035,330 | A * | 3/2000 | Astiz et al. | 709/218 |
| 6,041,360 | A * | 3/2000 | Himmel et al. | 709/245 |
| 6,047,260 | A * | 4/2000 | Levinson | 705/9 |
| 6,121,968 | A * | 9/2000 | Arcuri et al. | 715/825 |
| 6,144,971 | A * | 11/2000 | Sunderman et al. | 715/500 |
| 6,189,018 | B1 * | 2/2001 | Newman et al. | 715/205 |
| 6,189,024 | B1 * | 2/2001 | Bauersfeld et al. | 709/203 |
| 6,209,027 | B1 * | 3/2001 | Gibson | 709/218 |
| 6,237,006 | B1 | 5/2001 | Weinberg et al. | |
| 6,266,060 | B1 * | 7/2001 | Roth | 715/853 |
| 6,405,222 | B1 * | 6/2002 | Kunzinger et al. | 715/205 |
| 6,489,975 | B1 | 12/2002 | Patil et al. | |
| 6,667,751 | B1 * | 12/2003 | Wynn et al. | 715/833 |
| 6,781,611 | B1 * | 8/2004 | Richard | 715/779 |
| 6,957,395 | B1 * | 10/2005 | Jobs et al. | 715/765 |
| 7,062,475 | B1 * | 6/2006 | Szabo et al. | 706/11 |
| 7,080,324 | B1 * | 7/2006 | Nelson et al. | 715/771 |
| 7,080,325 | B2 * | 7/2006 | Treibach-Heck et al. | 715/780 |
| 7,167,901 | B1 * | 1/2007 | Beadle et al. | 709/207 |
| 7,177,901 | B1 * | 2/2007 | Dutta | 709/203 |
| 7,225,407 | B2 * | 5/2007 | Sommerer et al. | 715/738 |
| 7,353,182 | B1 * | 4/2008 | Missinhoun et al. | 705/8 |
| 7,617,458 | B1 * | 11/2009 | Wassom et al. | 715/760 |
| 2001/0023412 | A1 * | 9/2001 | Morimoto | 705/26 |
| 2002/0085017 | A1 * | 7/2002 | Pisutha-Arnond et al. | 345/660 |
| 2002/0175955 | A1 * | 11/2002 | Gourdol et al. | 345/821 |
| 2003/0061096 | A1 * | 3/2003 | Gallivan et al. | 705/14 |
| 2003/0120599 | A1 * | 6/2003 | Agboatwalla et al. | 705/50 |
| 2003/0169304 | A1 * | 9/2003 | Pagan | 345/843 |
| 2003/0193525 | A1 * | 10/2003 | Nygaard, Jr. | 345/810 |
| 2004/0001109 | A1 * | 1/2004 | Blancett et al. | 345/843 |
| 2004/0003351 | A1 * | 1/2004 | Sommerer et al. | 715/517 |
| 2004/0237051 | A1 * | 11/2004 | Clauson | 715/825 |
| 2005/0010594 | A1 * | 1/2005 | Chen et al. | 707/104.1 |
| 2005/0015429 | A1 * | 1/2005 | Ashley et al. | 709/200 |
| 2005/0015730 | A1 * | 1/2005 | Gunturi et al. | 715/777 |
| 2005/0114782 | A1 * | 5/2005 | Klinger | 715/742 |
| 2005/0114798 | A1 * | 5/2005 | Jiang et al. | 715/864 |

FOREIGN PATENT DOCUMENTS

| | | |
|---|---|---|
| EP | 0932108 A2 | 7/1999 |
| WO | 98/13747 | 4/1998 |
| WO | 01/63480 A3 | 8/2001 |

OTHER PUBLICATIONS http://psychology.wichta.edu/surl/usabilitynews/51/breadcrumb.htm, Lida et al., "Breadcrumb Navigation: An Exploratory Study of Usage," Feb. 2003, document obtained from the Internet on May 27, 2004.

* cited by examiner

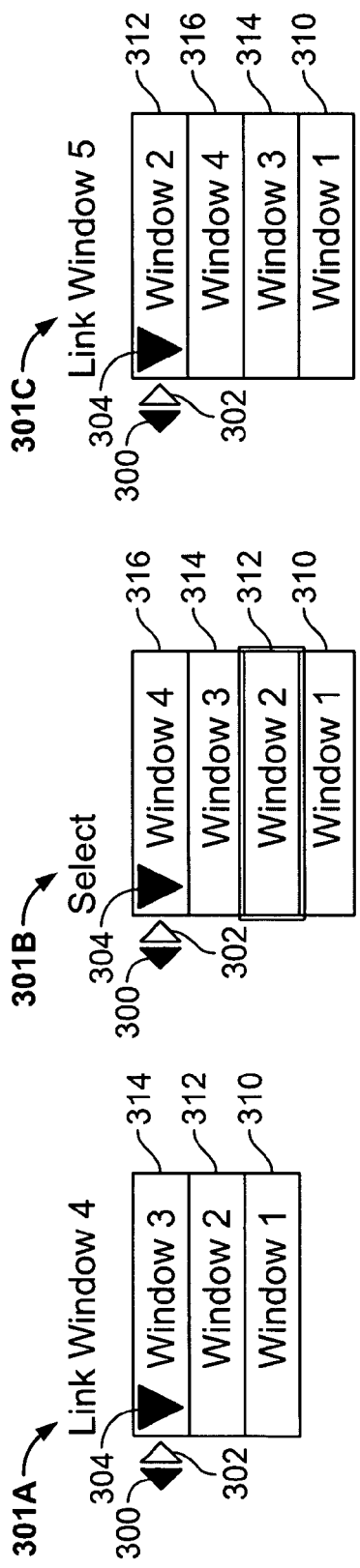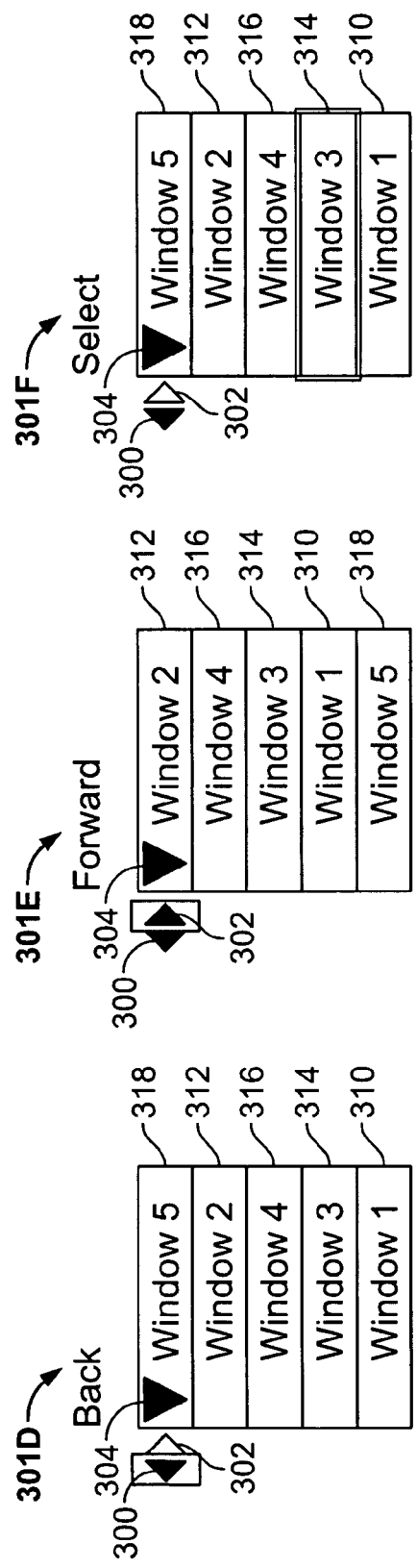

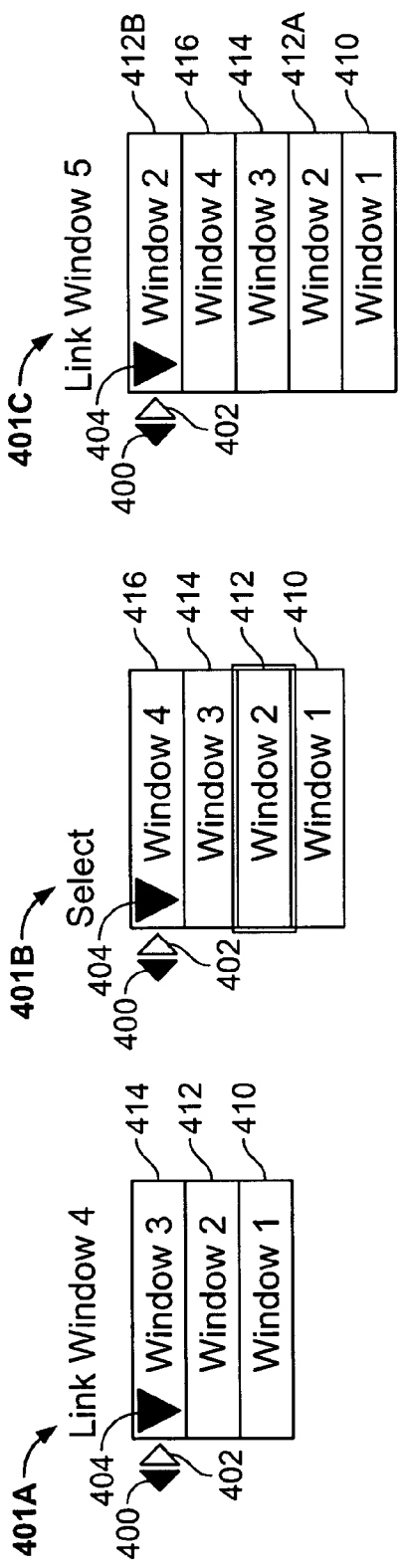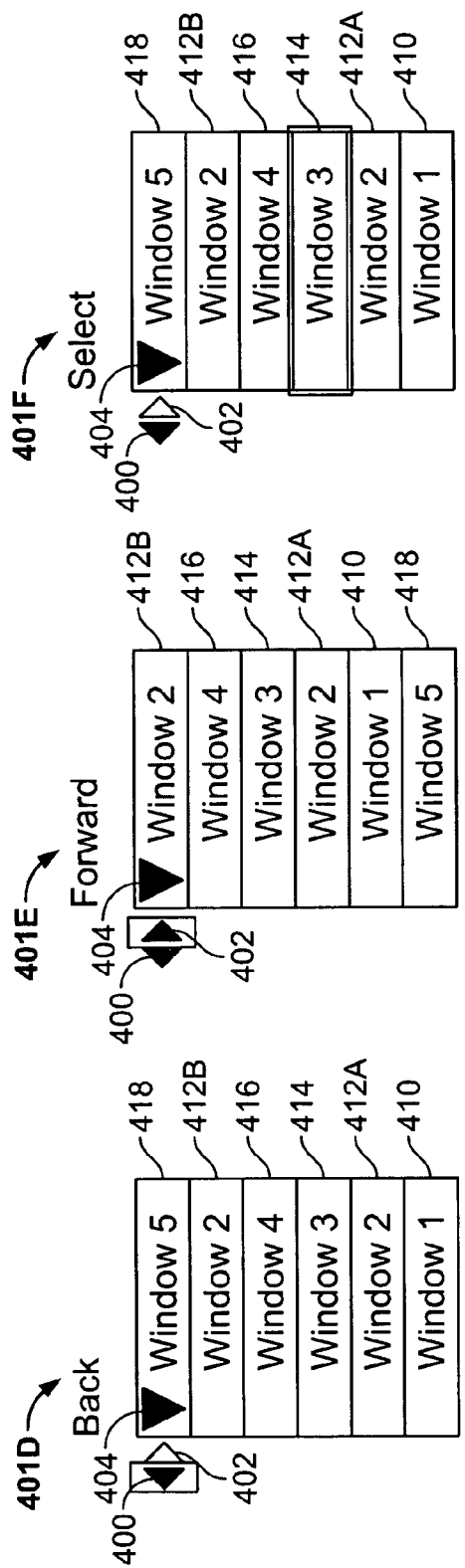

ACCESSING PREVIOUSLY VIEWED WINDOWS

RELATED APPLICATION

The present application claims the benefit of the filing date of U.S. Provisional Application No. 60/496,330, which was filed on Aug. 18, 2003.

TECHNICAL FIELD

This invention relates to accessing previously viewed windows in computing systems.

BACKGROUND

In recent years, telephone call centers have become much more widespread. The call centers manage many efforts, and call-center agents working in these centers often place and receive thousands of calls to and from various customers in different regions of the country. These agents often use headsets to speak with customers while they concurrently enter information relating to the customers into a computer workstation. The workstation may provide electronic forms for the entry of customer information.

More recently, telephone call centers have evolved into full-scale interaction centers, wherein agents may interact with customers via telephone, email, fax, or chat communication channels. Through the use of these interaction centers, agents are able to interact with customers in many different ways.

Additionally, agents have the ability to interact with two or more customers at the same time. For instance, an agent may be able to speak with one customer on the phone and concurrently interact with another customer in a chat session. As a result, the agent may be able to improve his or her efficiency.

In many situations, the agent will need to provide information within various screens or windows during the course of an interaction with a given customer. For instance, the agent may need to enter problem information into a data-entry field of a first window, and then later enter customer contact information into a data-entry field of a second window. During the course of the interaction, the agent may need to enter information into many different fields in various windows.

SUMMARY

Various implementations are provided herein. One implementation provides a method for accessing a window previously viewed by a user in a graphical user interface (GUI) during an interaction with an individual. The method includes displaying to the user a first window in the GUI. The first window contains a collapsible/expandable menu. The menu contains an entry that refers to a window previously viewed by the user. Upon selection of the entry in the menu, the method further includes displaying to the user the corresponding window previously viewed by the user in the GUI. The corresponding window has a data-entry field that contains a latest version of information that is related to the interaction with the individual that was previously entered or modified by the user.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 3A through FIG. 3F are screen diagrams of menus that may be used to access various windows displayed in the agent systems shown in FIG. 1, according to one implementation.

FIG. 4A through FIG. 4F are screen diagrams of menus that may be used to access various windows displayed in the agent systems shown in FIG. 1, according to another implementation.

DETAILED DESCRIPTION

Figure 1:
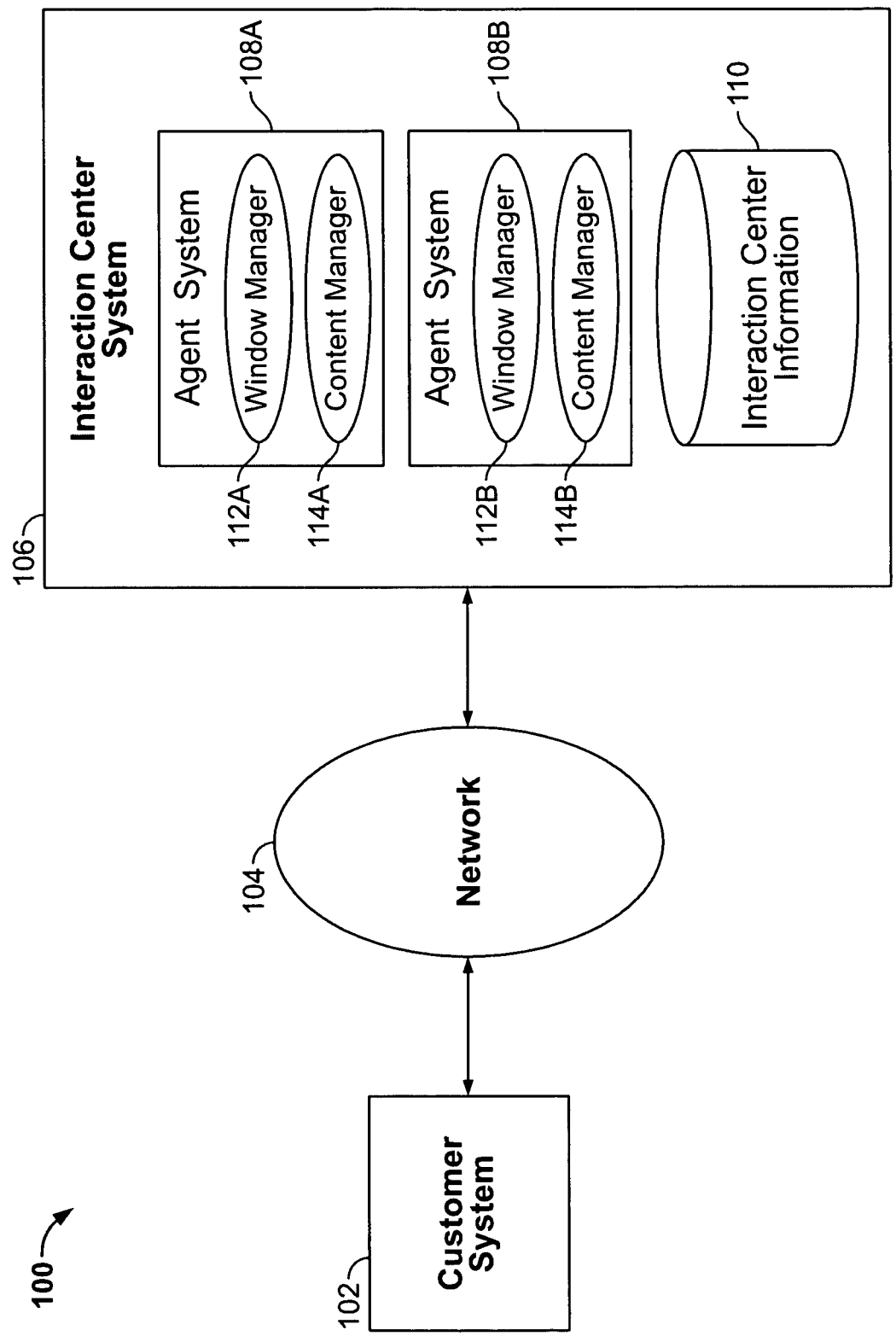
FIG. 1 is a block diagram of a system that may be used during interactions between a customer and an agent, according to one implementation.

FIG. 1 is a block diagram of a system 100 that may be used during interactions between a customer and an agent. The system 100 includes a customer system 102, a network 104, and an interaction center system 106. The customer system 102 is coupled to the interaction center system 106 through the network 104. During operation, a customer using the customer system 102 initiates a connection to the interaction center system 106. For example, if the network 104 is a telephone network, the customer may initiate a telephone connection to the interaction center system 106. If, however, the network 104 is a computer network, the customer may initiate an interactive-chat connection to the interaction center system 106. The customer may initiate various other forms of connections, such as email or fax connections, depending on the nature of the network 104. Once a connection is established, the customer may communicate with an agent who works in the interaction center system 106. The agent uses either an agent system 108A or 108B while interacting with the customer, and the agent may access information from or update information in an interaction center information repository 110. During the course of the interaction, the agent may need to quickly navigate through many different screens or windows displayed within the agent system 108A or 108B. Various implementations described below allow the agent to enter information and navigate to previously viewed windows in an efficient fashion.

As shown in FIG. 1, the interaction center system 106 contains the agent system 108A, the agent system 108B, and interaction center information 110. Each of the agent systems 108A and 108B are capable of accessing data from and storing information in the interaction center information 110 during the course of an interaction with a customer. The interaction center information 110 may contain customer information, transaction information, or the like. In one implementation, the interaction center system 106 contains a server management system (not shown) that interacts with each agent system 108A and 108B and that is also coupled to the interaction center information 110. In this implementation, the server management system helps manage and oversee the interaction between the customer system 102 and the agent system 108A or 108B. The agent system 108A or 108B may continually interact with the server management system during the course of the interaction.

Each of the agent systems 108A and 108B include a window manager (112A and 112B, respectively) and a content manager (114A and 114B, respectively). The window managers 112A and 112B are responsible for managing the windows that are displayed to agents using the agent systems 108A and 108B, respectively. For example, the window manager 112A is responsible for managing all of the windows that are displayed in a graphical user interface (GUI) to an agent using the agent system 108A during an interaction with a customer. The content managers 114A and 114B are responsible for managing the content displayed in the windows that are managed by the window managers 112A and 112B, respectively. For example, the content manager 114A is responsible for managing a latest version of the content that is displayed in the windows managed by the window manager 112A on the agent system 108A. The content manager 114A is capable of accessing information from and storing information in the interaction center information repository 110 when managing the content to be displayed in these windows. In one implementation, the interaction center system 106 includes a server management system (not shown) that manages the window managers 112A and 112B and the content managers 114A and 114B on the agent systems 108A and 108B, respectively. In another implementation, the window managers 112A and 112B and the content mangers 114A and 114B are located on the server management system. In this implementation, the server management system controls the agent systems 108A and 108B.

Figure 2A:
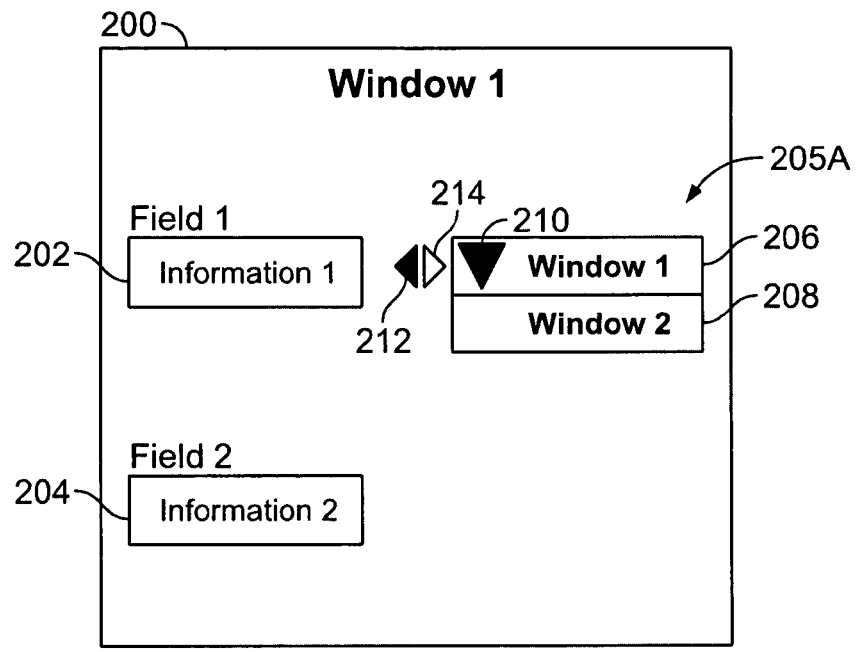
FIG. 2A and FIG. 2B are screen diagrams of windows that may be displayed in the agent systems shown in FIG. 1.
Figure 2B:
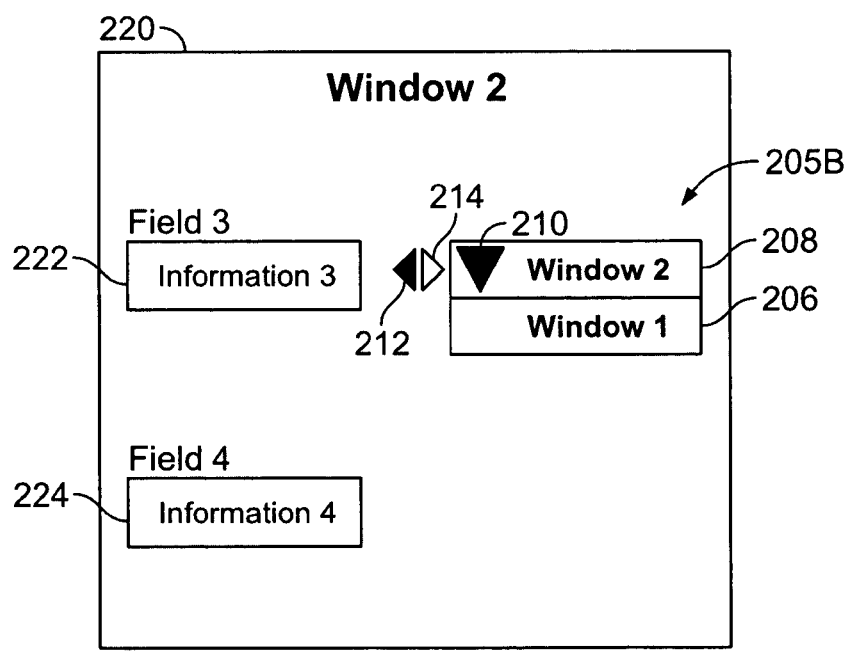

FIG. 2A and FIG. 2B are screen diagrams of windows 200 and 220 that may be displayed in the agent systems 108A and 108B shown in FIG. 1. For example, the window 200 shown in FIG. 2A may be managed by the window manager 112A and displayed in a GUI to an agent using the agent system 108A during an interaction with a customer. The window manager 112A also manages the fields and menus that are shown within the window 200. As shown in FIG. 2A, the window 200 includes a first data-entry field 202, a second data-entry field 204, and a collapsible/expandable menu 205A. The content manager 114A manages the content of the first and second data-entry fields 202 and 204. In one implementation, the content manager 114A provides a most recent or a latest version of the content within the first and second data-entry fields 202 and 204. As shown in the example of FIG. 2A, the agent has entered in the phrase "Information 1" into the first data-entry field 202 and also entered in the phrase "Information 2" into the second date-entry field 204.

When the menu 205A is closed, the agent may only see one entry 206. In FIG. 2A, the entry 206 is "Window 1", which corresponds to the window 200. However, when the agent selects a button 210, the menu 205A expands and displays to the agent the entries 206 and 208. The entry 208 is "Window 2", which corresponds to a specific window previously viewed by the agent. In particular, "Window 2" corresponds to the window 220 shown in FIG. 2B. The menu 205A shown in FIG. 2A is a drop-down menu.

If the agent selects the entry 208 in the menu 205A, the agent system 108A displays to the agent the window 220 shown in FIG. 2B. The window 220 has a title of "Window 2". The window 220 contains a menu 205B, a first data-entry field 222, and a second data-entry field 224. The content manager 114A manages a latest version of the content for the first and second data-entry fields 222 and 224, which each contain information previously entered or modified by the agent that relates to a given interaction with a customer. The content manager 114A provides the most recent or the latest version of the content for these fields 222 and 224. For example, if the agent has previously modified information within the fields 222 and 224 multiple times during the interaction with the customer, the content manager 114A is capable of providing the most recent information as the latest version in the fields 222 and 224. As shown in FIG. 2B, the first data-entry field 222 contains the phrase "Information 3", and the second data-entry field 224 contains the phrase "Information 4". The agent previously entered or modified these phrases into the first and second data-entry fields 222 and 224 during a previous phase of the customer interaction and is able to view the current content in these fields by selecting the entry 208. As shown in FIG. 2B, the entry 208 is listed above the entry 206 in the menu 205B.

The menus 205A and 205B contained in the windows 200 and 220 also include a forward button 214 and a back button 212. These buttons allow the agent to quickly navigate through entries according to their respective order in the menus 205A and 205B. For example, the agent may select the back button 212 to select an entry in the menu 205A that corresponds to the last window previously viewed by the agent. In the example shown in FIG. 2A, the entry 206 corresponds to the currently displayed window (i.e., "Window 1", or the window 200), and the entry 208 corresponds to the previously viewed window (i.e., "Window 2", or the window 220). As such, the entries 206 and 208 are arranged in an order opposite to that in which the agent viewed or accessed the corresponding windows.

In FIG. 2A, if the agent selects the back button 212 in the menu 205A, the window 220 shown in FIG. 2B would be displayed to the agent, as it corresponds to the previously viewed window. All of the information contained within the first and second data-entry fields 202 and 204 are stored by the agent system 108A before the window 220 is displayed. The content manager 114A of the agent system 108A is responsible for storing this information into the interaction center information repository 110. In addition, the window manager 112A is responsible for storing the layout and configuration of the window 200. The window manager 112A also obtains the layout and configuration of the window 220 in preparing it for display. As shown in FIG. 2B, the window manager 112A determines that the window 220 contains the menu 205B, the first data-entry field 222, and the second data-entry field 224. The content manager 114A then retrieves from the interaction center information repository 110 the latest version of the contents for the first and second data-entry fields 222 and 224. These contents are then displayed to the agent in the window 220.

In FIG. 2B, if the agent selects the forward button 214 in the menu 205B, the window 200 shown in FIG. 2A would again be displayed to the agent. In this fashion, the agent can navigate forward to the window 200, which corresponds to the more recently accessed or displayed window. The window manager 112A determines the layout and configuration for the window 200, and the content manager 114A then retries the latest version of the contents for the first and second data-entry fields 202 and 204. These contents are then displayed to the agent in the window 200.

FIG. 3A through FIG. 3F are screen diagrams of menus 301A-301F that may be used to access various windows displayed on either of the agent systems 108A or 108B, according to one implementation. The menu 301A may be included within each of the windows that are displayed. As is shown in FIG. 3A, the menu 301A includes an entry 310, an entry 312, an entry 314, a drop-down button 304, a back button 300, and a forward button 302. The menu 301A shown in FIG. 3A is similar in format to the menu 205 shown in FIG. 2A and FIG. 2B. Because the entry 314 is located at the top of the menu 301A, it corresponds to the window (named "Window 3") that is currently displayed to the agent. The entry 312 is located beneath the entry 314, indicating that it corresponds to the window (named "Window 2") that was previously displayed to the agent. Lastly, the entry 310 is located beneath the entry 312, indicating that corresponds to the window (named "Window 1") that was displayed to the agent before "Window 2". According to this example shown in FIG. 3A, the entries 314, 312, 310 are displayed in a top-down fashion according to the order in which the corresponding windows were accessed by and displayed to the agent. The agent may select the drop-down button 304 a first time to see all of the entries 310, 312, and 314 in the menu 301A, and may select the button 304 a second time to collapse the menu 301A and see only the top-most entry 314 that corresponds to the current window.

While viewing the current window, named "Window 3", the agent may decides to link to a new window, named "Window 4". Once the agent makes a selection to link to "Window 4", the window manager 112A or 112B will save the layout and configuration of "Window 3", and the content manager 114A or 114B will save the contents of "Window 3". The agent will then be presented with a display of "Window 4". The layout and configuration of "Window 4" are managed by the window manger 112A or 112B, and the contents of "Window 4" are managed by the content manger 114A or 114B. "Window 4" includes a menu 301B, as shown in FIG. 3B. The menu 301B includes the entries 314, 312, and 310 in the same position and order as shown in the menu 301A in FIG. 3A, but the menu 301B also includes an entry 316 as the top-most entry as well. The entry 316 corresponds to "Window 4", which is the currently displayed window with the GUI.

If the agent decides to select the entry 312 in the menu 301B, which corresponds to "Window 2", the window manager 112A or 112B store the layout and configuration of "Window 4" and then obtain and display in the GUI the layout and configuration of the selected "Window 2". Similarly, the content manager 114A or 114B will store the contents of "Window 4" and then obtain and display the current contents of "Window 2". "Window 2" includes a menu 301C, as shown in FIG. 3C.

Because "Window 2" was selected as the current window, its corresponding entry 312 is listed at the top of the menu 301C. The entry 316, corresponding to the previously viewed "Window 4", is listed below the entry 312. The menu 301C also includes the entries 314 and 310. According to the implementation shown in FIG. 3A through FIG. 3F, each entry is listed only once in the menus 301A through 301F. As such, the entry 312 is listed only once in the menu 301C.

If the agent chooses to link to a new window, named "Window 5", the window manager 112A or 112B and the content manager 114A or 114B manage the layout, configuration, and contents of "Window 2" and the newly displayed "Window 5" in a manner similar to that described above. The newly displayed "Window 5" includes a menu 301D shown in FIG. 3D. The menu 301D contains the same entries 312, 316, 314, and 310 and the same ordering as the menu 301C. However, the menu 301D also includes a new entry 318, corresponding to the newly displayed "Window 5", as the top-most entry.

The agent may also make use of the forward button 302 and the back button 300 that are included in each of the menus 301A through 301F to navigate to different windows in the GUI. For example, the agent may select the back button 300, as is shown in FIG. 3D. to navigate to the previously viewed window, which is "Window 2". The window manager 112A or 112B and the content manager 114A or 114B manage the layout, configuration, and contents of "Window 5" and the newly displayed "Window 2". "Window 2" includes a menu 301E that is shown in FIG. 3E. The entry 312, which corresponds to "Window 2", is listed at the top of the menu 301E. The entry 318, which corresponds to "Window 5", is listed at the bottom of the menu 301E. If, as shown in FIG. 3E, the agent then selects the forward button 302, the GUI navigates forward to "Window 5", which includes the menu 301F shown in FIG. 3F. The menu 301F is the same as the menu 301D shown in FIG. 3D. By using the forward button 302 and the back button 300, the agent is able to quickly navigate to various different windows that have been previously viewed.

FIG. 4A through FIG. 4F are screen diagrams of menus 401A-401F that may be used to access various windows displayed on either of the agent systems 108A or 108B, according to another implementation. In this implementation, there can be multiple entries in any given menu that correspond to the same window. (In the menus 301A through 301F shown in FIG. 3A through FIG. 3F, there is only entry for each corresponding window.) The multiple entries allow an agent to see an entry corresponding to the currently displayed window both at the top of the menu and at a position in the menu indicating when the same window had been previously displayed.

For example, FIG. 4A is a diagram of a menu 401A that includes entries 410, 412, and 414. The entry 410 corresponds to "Window 1", the entry 412 corresponds to "Window 2", and the entry 414 corresponds to "Window 3". The entry 414 is included at the top of the menu 401A, indicating that "Window 3" is the currently displayed window. The agent may select a button 404 a first time to see all of the entries 410, 412, and 414 in the menu 401A (i.e., to expand the menu), and may then select the button 404 a second time to collapse the menu 401A and see only the entry 414. When the agent links to a new window, named "Window 4", the window manager 112A or 112B and the content manager 114A or 114B manage the layout, configuration, and content of the windows "Window 3" and "Window 4". "Window 4" contains a menu 401B, as shown in FIG. 4B. The menu 401B contains the same entries 414, 412, and 410, as well as the same ordering of these entries, as the menu 401A. However, the menu 401B also contains an entry 416 as the top-most entry to indicate that "Window 4" is the currently displayed window.

If the agent selects the entry 412 in the menu 401B, the GUI will display "Window 2" having a menu 401C, as shown in FIG. 4C. The menu 401C contains the same entries 410, 412 (which is re-labeled as entry 412A), 414, and 416 as the menu 401B, and also contains a second entry 412B that also corresponds to "Window 2". As such, the menu 401C contains two distinct entries 412A and 412B that each correspond to "Window 2". The entry 412A is included to indicate that "Window 2" was previously displayed prior to "Window 3" (corresponding to the entry 414) but subsequent to "Window 1" (corresponding to the entry 410). The entry 412B is included to further indicate that "Window 2" is also the currently displayed window.

If the agent links to a new window, named "Window 5", the menu 401D shown in FIG. 4D is then displayed within "Window 5". The menu 401D includes the same entries 410, 412A, 414, 416, and 412B as included within the menu 401C, and also includes an entry 418 as the top-most entry to indicate that "Window 5" is the currently displayed window.

If the agent selects a back button 400 in the menu 401D, the previously displayed window ("Window 2") is again displayed. "Window 2" contains the menu 301E, which is shown in FIG. 4E. The entry 412B is listed at the top of the menu 401E to indicate that it is the currently displayed window. When the agent selects the back button 400, the entry 418, which corresponds to the previously displayed window (i.e., "Window 5"), is located at the bottom of the menu 401E. If the agent then selects the forward button 402 in the menu 401E, "Window 5" is again displayed. "Window 5" includes the menu 401F, which is shown in FIG. 4F. Because "Window 5" is displayed to the agent as the current window, the entry 418 is listed at the top of the menu 401F. The entry 412B, which corresponds to the previously displayed window (i.e., "Window 2"), is located directly beneath the entry 418.

Figure 5A:
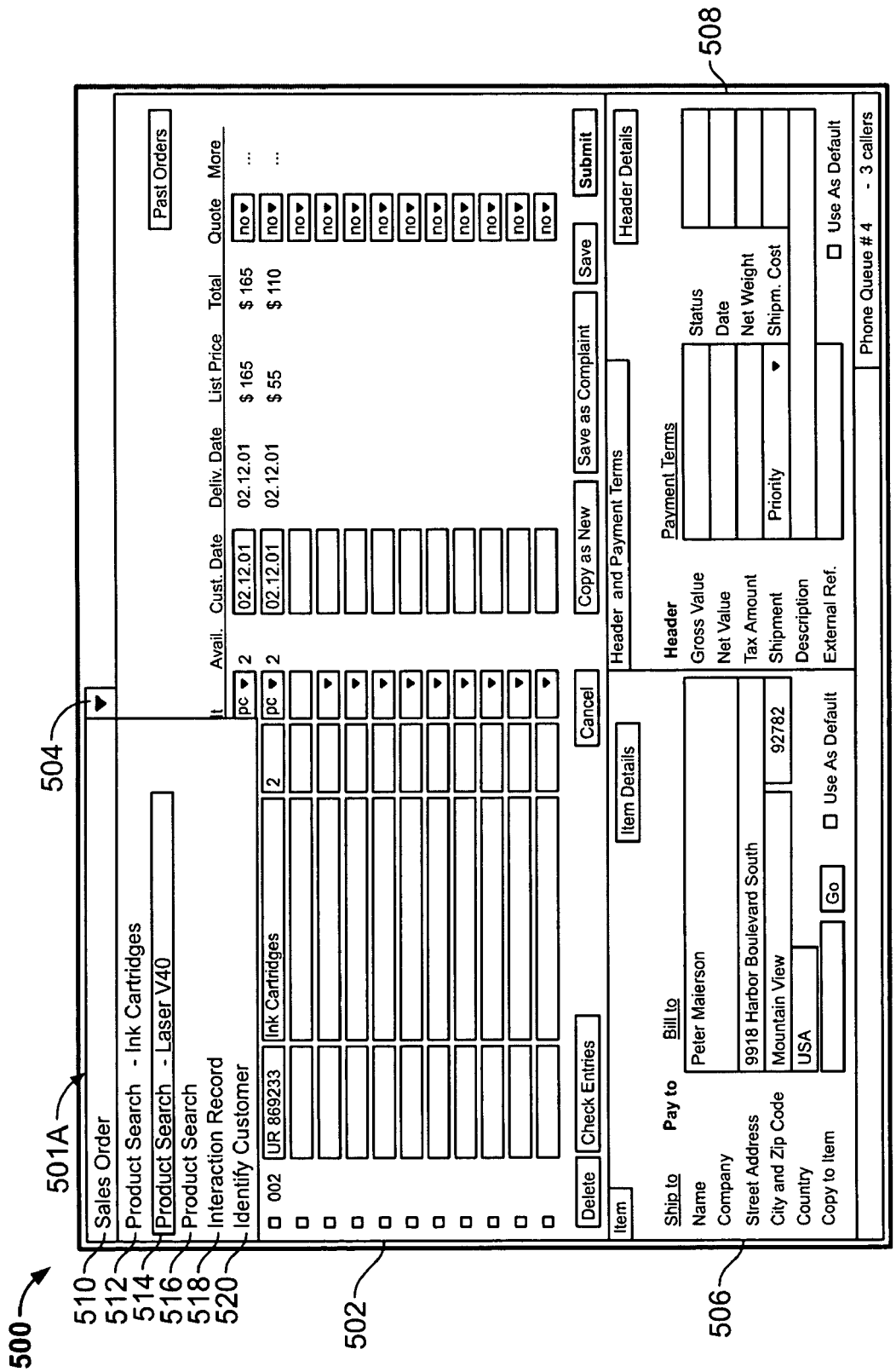
FIG. 5A and FIG. 5B are screen diagrams of windows that may be accessed in an interaction center application, according to one implementation.
Figure 5B:
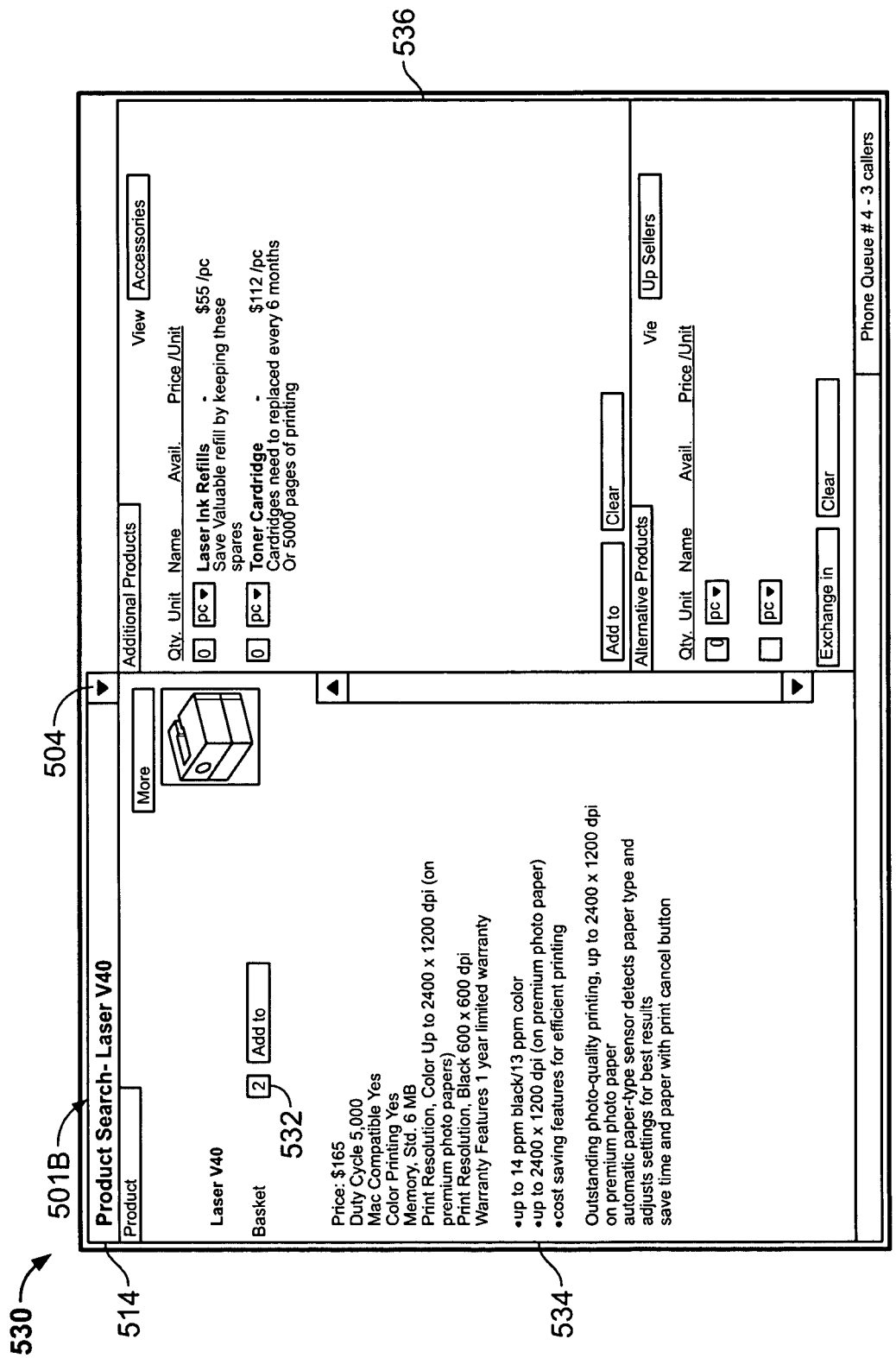

FIG. 5A and FIG. 5B are screen diagrams of windows that may be accessed in an interaction center application, according to one implementation. In FIG. 5A, the window 500 includes a collapsible/expandable menu 501A and window areas 502, 506, and 508. As will be described below, the menu 501A may be used by the agent to quickly and easily navigate to previously viewed windows. The window 500 corresponds to a sales order phase of the interaction center application. During this phase, the agent interacts with a customer to initiate a sales order. In the window area 502, the agent may enter information relating to the products and/or services ordered by the customer using various data-entry fields, such as text boxes, menus, and the like. The agent may enter or modify information associated with these various data-entry fields to specify price, cost, date, product availability, quantity, or other forms of information that may be used for ordering purposes.

The window area 506 contains various shipping and billing information relating to the customer interaction. As shown in FIG. 5A, the window area 506 may include name, company, and address information. The window area 508 various other forms of information that may be used during the sales order phase, such as payment term, value, weight, or other forms of information.

When using the window 500, the agent may select a button 504 to see all of the entries 510, 512, 514, 516, 518, and 520 contained within the menu 501A. The entry 510 corresponds to the currently displayed window, which is named "Sales Order". Each of the other entries 512, 514, 516, 518, and 520 correspond to previously viewed windows used by the agent during the interaction center application. In the example shown in FIG. 5A, these entries are listed in a top-down fashion in the menu 501A according to the order in which the corresponding windows were last displayed to the agent. As shown, the agent accessed and viewed the window named "Product Search—Ink Cartridges" just prior to viewing the current window named "Sales Order". By selecting the button 504 and viewing the entries 510, 512, 514, 516, 518, and 520, the agent can see a history of the windows that he or she has accessed during the course of an interaction with a customer. In addition, the agent can directly select one of the entries contained within the menu 501A to navigate to the corresponding window. As shown in the example of FIG. 5A, the agent has selected the entry 514, which corresponds to the window named "Product Search—Laser V40".

When the agent selects the entry 514, a window manager, such as the window manager 112A or 112B shown in FIG. 1, stores the layout and configuration of the window 500. For example, the window manager may store the layout and configuration of the window areas 502, 506, and 508 with respect to each other, as well as the layout and configuration of the menu 501A. A content manger, such as the content manager 114A or 114B shown in FIG. 1, stores the contents of the window 500. For example, the content manager may store the contents of the window areas 502, 506, and 508, and also the contents of the menu 501A.

The window manager and content manager also load the layout, configuration, and contents of a new window 530 that corresponds to the selected entry 514 from the menu 501A. This new window 530 is shown in FIG. 5B. The window 530 includes a collapsible/expandable menu 501B and window areas 534 and 536. The contents of the menu 501B and the window areas 534 and 536 are loaded so that the agent may see the most current information contained within the window 530. For example, the window area 534 contains product information for the "Laser V40". The window area 534 also contains a data-entry field 532 in which the agent may enter the number of products to be added to the online shopping basket for the sales order. The contents of this data-entry field 532 indicate the current entry for the number of products in the basket. As shown in the example of FIG. 5B, the data-entry field 532 indicates that there are "2" products in the basket. This information may have been provided when the agent previously accessed the window 530. The agent may modify the contents of the data-entry field 532 to change the number of products included within the basket as a result of further interaction with the customer.

The window area 536 contains information relating to additional products that may be part of the sales order. These additional products, such as accessory products, may be related to the "Laser V40" printer product. The window area 536 also contains various text-entry fields that display the most recent information based upon prior entry by the agent. The agent may modify the data contained within these fields to change such things as product quantity, unit types, and the like.

The menu 501B in the window 530 lists the entry 514 as the top-most entry because it corresponds to the currently displayed window shown in FIG. 5B, which is named "Product Search—Laser V40". The menu 501B is shown in collapsed form. If the agent were to select the button 504, the menu 501B could expand to show the other entries 510, 512, 516, 518, and 520, which were also included in the menu 501A.

Figure 6:
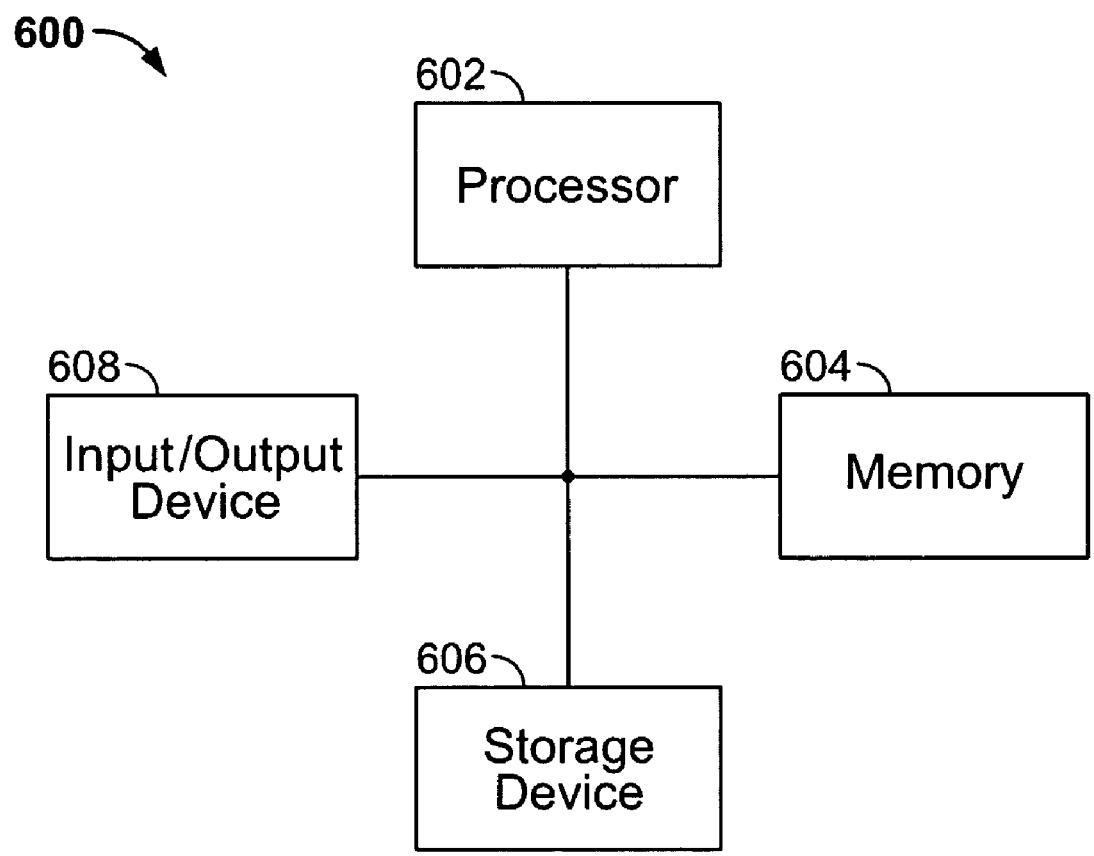
FIG. 6 is a block diagram of a computing system that may be included within the customer and/or agent systems shown in FIG. 1, according to one implementation.

FIG. 6 is a block diagram of a computing system 600 that may be included within the customer system 102 and/or the agent systems 108A and 108B shown in FIG. 1, according to one implementation. The computing system 600 includes a processor 602, a memory 604, a storage device 606, and an input/output device 608. Each of the components 602, 604, 606, and 608 are interconnected using a system bus. The processor 602 is capable of processing instructions for execution within the computing system 600. In one implementation, the processor 602 is a single-threaded processor. In another implementation, the processor 602 is a multi-threaded processor. The processor 602 is capable of processing instructions stored in the memory 604 or on the storage device 606 to display graphical information for a GUI on the input/output device 608.

The memory 604 stores information within the computing system 600. In one implementation, the memory 604 is a computer-readable medium. In one implementation, the memory 604 is a volatile memory unit. In another implementation, the memory 604 is a non-volatile memory unit.

The storage device 606 is capable of providing mass storage for the computing system 600. In one implementation, the storage device 606 is a computer-readable medium. In various different implementations, the storage device 606 may be a floppy disk device, a hard disk device, an optical disk device, or a tape device.

In one implementation, a computer program product is tangibly embodied in an information carrier. The computer program product contains instructions that, when executed, perform various methods, such as those described above. The information carrier is a computer- or machine-readable medium, such as the memory 604, the storage device 606, or a propagated signal.

The input/output device 608 provides input/output operations for the computing system 600. In one implementation, the input/output device 608 includes a keyboard and/or pointing device. In one implementation, the input/output device 608 includes a display unit for displaying the various GUI's shown in the preceding figures.

A number of implementations of the invention have been described. Nevertheless, it will be understood that various modifications may be made without departing from the spirit and scope of the invention. Accordingly, other implementations are within the scope of the following claims.

What is claimed is:

1. A method for accessing a window previously viewed by an interaction center agent in a graphical user interface (GUI) during an interaction with a customer, the method comprising:

during the interaction, displaying to the agent a first window in the GUI, wherein the first window contains a menu and a back button, wherein the menu contains multiple entries that refer to windows that have been previously displayed to the agent during the interaction, including the first window, wherein the entries in the menu are arranged in an order opposite to that in which the corresponding windows were displayed to the agent, wherein each of the windows corresponding to the entries is only listed once in the menu with an entry corresponding to the first window displayed at the beginning of the menu, and wherein the agent is able to expand or collapse the menu in the GUI;

during the interaction, receiving an input of information from the agent in a data-entry field of the first window;

during the interaction, storing in an interaction information repository the input of information contained in the data-entry field of the first window;

receiving a selection of the back button;

upon selection of the back button:

retrieving from the interaction information repository a latest version of information that was previously entered or modified by the agent during the interaction in a data-entry field of a window displayed immediately prior to the first window;

displaying to the agent the prior window in the GUI, wherein the data-entry field of the prior window contains only the retrieved latest version of information that is related to the interaction with the customer that was previously entered or modified by the agent during the interaction in the data-entry field of the prior window, wherein the prior window contains the menu and the back button; and moving the entry that refers to the prior window to the beginning of the menu and moving the entry that refers to the first window to the end of the menu;

receiving a selection of one of the entries in the menu; and upon selection of the entry in the menu:

retrieving from the interaction information repository a latest version of information that was previously entered or modified by the agent during the interaction in a data-entry field of the window corresponding to the selected entry;

displaying to the agent the window corresponding to the selected entry, wherein the data-entry field of the window corresponding to the selected entry contains only the retrieved latest version of information that is related to the interaction with the customer that was previously entered or modified by the agent during the interaction in the data-entry field of the window corresponding to the selected entry, wherein the window corresponding to the selected entry contains the menu and the back button; and moving the selected entry to the beginning of the menu.

2. The method of claim 1, wherein the entries in the menu include titles of the windows previously displayed to the agent during the interaction.

3. The method of claim 1, wherein the menu is a drop-down menu.

4. The method of claim 1, wherein the window corresponding to the selected entry contains additional data-entry fields that each contain a latest version of information previously entered or modified by the agent relating to the interaction with the customer.

5. The method of claim 1, wherein the interaction has been initiated by the customer.

6. A computer program product tangibly embodied in a storage device, the computer program product including instructions that, when executed by a processor, perform operations for accessing a window previously viewed by an interaction center agent in a graphical user interface (GUI) during an interaction with a customer, the operations comprising:

during the interaction, displaying to the agent a first window in the GUI, wherein the first window contains a menu and a back button, wherein the menu contains multiple entries that refer to windows that have been previously displayed to the agent during the interaction, including the first window, wherein the entries in the menu are arranged in an order opposite to that in which the corresponding windows were displayed to the agent, wherein each of the windows corresponding to the entries is only listed once in the menu with an entry corresponding to the first window displayed at the beginning of the menu, and wherein the agent is able to expand or collapse the menu in the GUI;

during the interaction, receiving an input of information from the agent in a data-entry field of the first window;

during the interaction, storing in an interaction information repository the input of information contained in the data-entry field of the first window;

receiving a selection of the back button;

upon selection of the back button:

retrieving from the interaction information repository a latest version of information that was previously entered or modified by the agent during the interaction in a data-entry field of a window displayed immediately prior to the first window;

displaying to the agent the prior window in the GUI, wherein the data-entry field of the prior window contains only the retrieved latest version of information that is related to the interaction with the customer that was previously entered or modified by the agent during the interaction in the data-entry field of the prior window, wherein the prior window contains the menu and the back button; and moving the entry that refers to the prior window to the beginning of the menu and moving the entry that refers to the first window to the end of the menu;

receiving a selection of one of the entries in the menu; and upon selection of the entry in the menu:

retrieving from the interaction information repository a latest version of information that was previously entered or modified by the agent during the interaction in a data-entry field of the window corresponding to the selected entry;

displaying to the agent the window corresponding to the selected entry, wherein the data-entry field of the window corresponding to the selected entry contains only the retrieved latest version of information that is related to the interaction with the customer that was previously entered or modified by the agent during the interaction in the data-entry field of the window corresponding to the selected entry, wherein the window corresponding to the selected entry contains the menu and the back button; and moving the selected entry to the beginning of the menu.

7. A system for accessing a window previously viewed by an interaction center agent in a graphical user interface (GUI) during an interaction with a customer, the system comprising:

a processor;

a memory unit in operable communication with the processor and storing instructions that, when executed by the processor, cause the system to perform the following operations:

during the interaction, display to the agent a first window in the GUI, wherein the first window contains a menu and a back button, wherein the menu contains multiple entries that refer to windows that have been previously displayed to the agent during the interaction, including the first window, wherein the entries in the menu are arranged in an order opposite to that in which the corresponding windows were displayed to the agent, wherein each of the windows corresponding to the entries is only listed once in the menu with an entry corresponding to the first window displayed at the beginning of the menu, and wherein the agent is able to expand or collapse the menu in the GUI;

during the interaction, receive an input of information from the agent in a data-entry field of the first window;

during the interaction, store in an interaction information repository the input of information contained in the data-entry field of the first window;

receive a selection of the back button;

upon selection of the back button:

retrieve from the interaction information repository a latest version of information that was previously entered or modified by the agent during the interaction in a data-entry field of a window displayed immediately prior to the first window;

display to the agent the prior window in the GUI, wherein the data-entry field of the prior window contains only the retrieved latest version of information that is related to the interaction with the customer that was previously entered or modified by the agent during the interaction in the data-entry field of the prior window, wherein the prior window contains the menu and the back button; and move the entry that refers to the prior window to the beginning of the menu and move the entry that refers to the first window to the end of the menu;

receive a selection of one of the entries in the menu; and upon selection of the entry in the menu:

retrieve from the interaction information repository a latest version of information that was previously entered or modified by the agent during the interaction in a data-entry field of the window corresponding to the selected entry;

display to the agent the window corresponding to the selected entry, wherein the data-entry field of the window corresponding to the selected entry contains only the retrieved latest version of information that is related to the interaction with the customer that was previously entered or modified by the agent during the interaction in the data-entry field of the window corresponding to the selected entry, wherein the window corresponding to the selected entry contains the menu and the back button; and move the selected entry to the beginning of the menu.

\* \* \* \* \*